Dec. 3, 1963  E. J. BUCZAK  3,112,934
NESTING MARKET CART

Filed Dec. 26, 1961  4 Sheets-Sheet 1

INVENTOR.
EDWIN J. BUCZAK
BY
ATTORNEY

Dec. 3, 1963  E. J. BUCZAK  3,112,934
NESTING MARKET CART
Filed Dec. 26, 1961  4 Sheets-Sheet 2
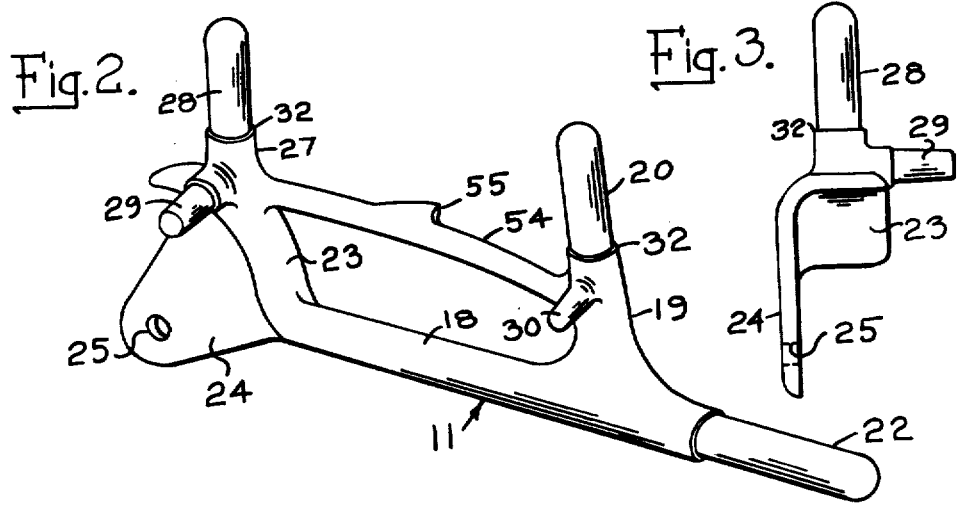
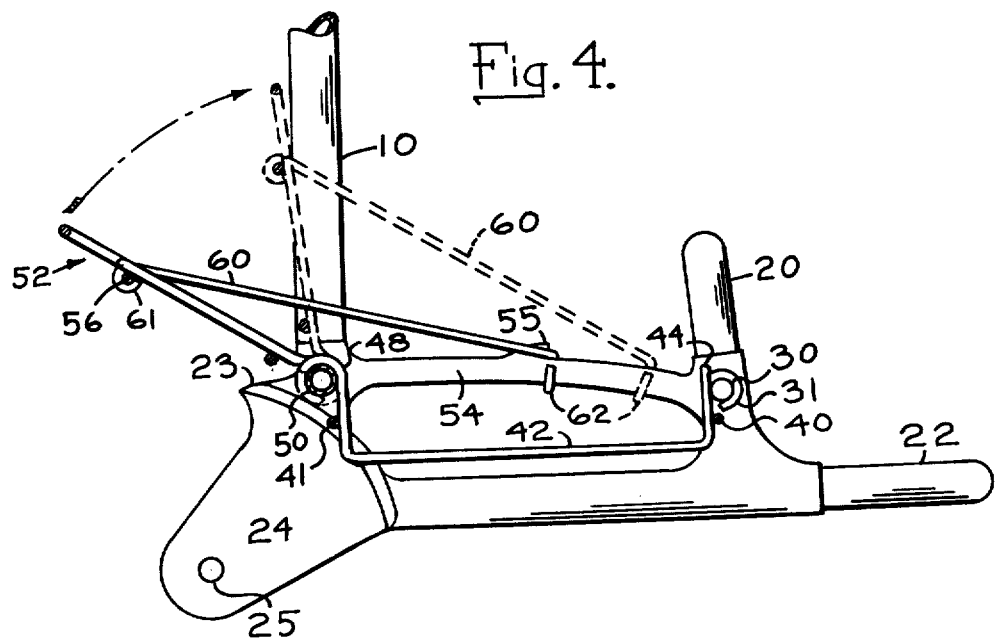
INVENTOR.
EDWIN J. BUCZAK
BY
ATTORNEY Dec. 3, 1963  E. J. BUCZAK  3,112,934
NESTING MARKET CART Filed Dec. 26, 1961  4 Sheets-Sheet 3

INVENTOR.
EDWIN J. BUCZAK
BY
Clayton L. Jenks
ATTORNEY

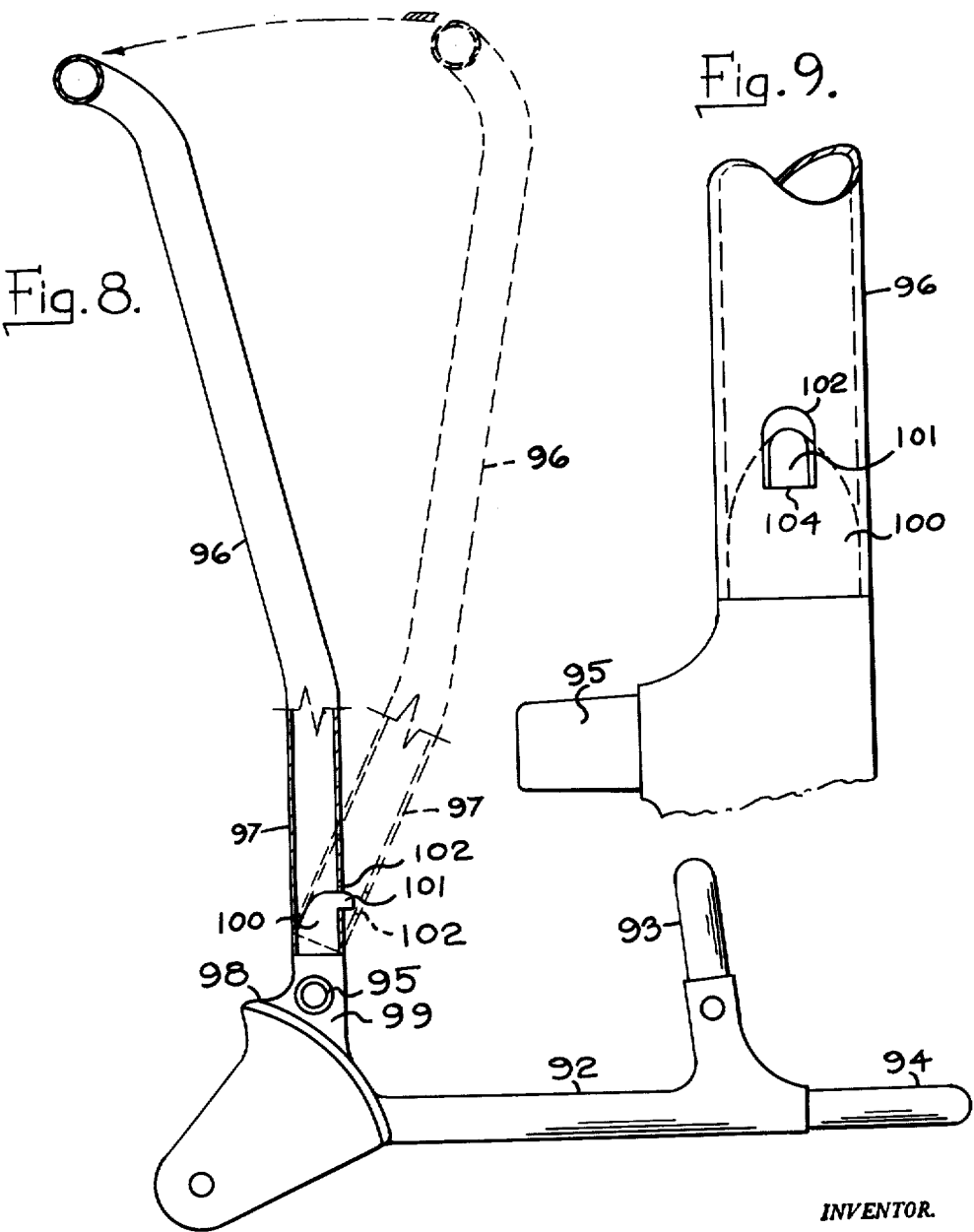

United States Patent Office 3,112,934
Patented Dec. 3, 1963

1

3,112,934
NESTING MARKET CART
Edwin J. Buczak, 145 Wildwood Ave., Worcester, Mass.
Filed Dec. 26, 1961, Ser. No. 161,911
5 Claims. (Cl. 280—33.99)

This invention relates to a nesting market cart, and more particularly to the structure of the under-carriage and a lower parcel tray beneath the market basket.

Heretofore, various sections of the supporting frame of a cart of the type herein illustrated have been assembled by means of screws, rivets and bolts. Such structures have been seriously weakened by the holes required in the structure for the fasteners and the latter have been subject to loosening and breakage during service. The assembly of such a structure has been time consuming and expensive because of the many components and operations involved.

One object of this invention is to provide an under-carriage for a market cart which is relatively free of maintenance requirements by eliminating the use of mechanical fastening devices generally subject to loosening and breakage in service.

Another object is to provide an under-carriage structure of high strength for a market cart in which the tubular frame elements may be press fitted onto projecting nipples of a casting to form a rigid and substantially integral structure, without requiring the use of supplemental fasteners.

Market carts have heretofore been provided with a tray beneath the main basket serving as an auxiliary parcel carrying area or compartment. Such trays have had limited access from the rear of the cart because of interference resulting from the structural components of the under-carriage and also because trays of this general type have been so located as to extend forward in the cart structure. Primary access to trays of this type has been either from the sides or front of the cart, which has presented an awkward and difficult unloading problem and particularly when carts are wheeled into very narrow aisles associated with typical check out counters in modern grocery stores.

A further object of this invention is to provide a lower parcel compartment or tray having a rearwardly projecting extension shelf which is completely accessible from the rear of the cart and which will automatically open and collapse so as not to interfere when duplicate carts of this type are nested or telescoped together for compact storage. Other objects will be apparent in the following disclosure.

Referring to the drawings illustrating preferred embodiments of the invention:

FIG. 2 is a perspective view of the frame casting, shown at the far side of FIG. 1, which has a central arch and projecting nipples thereon;

FIG. 3 is a vertical rear end elevation of the casting of FIG. 2;

FIG. 4 is a fragmentary side elevation of the casting showing the hinged shelf extension in both an open and a collapsed position;

2

Figure 5:
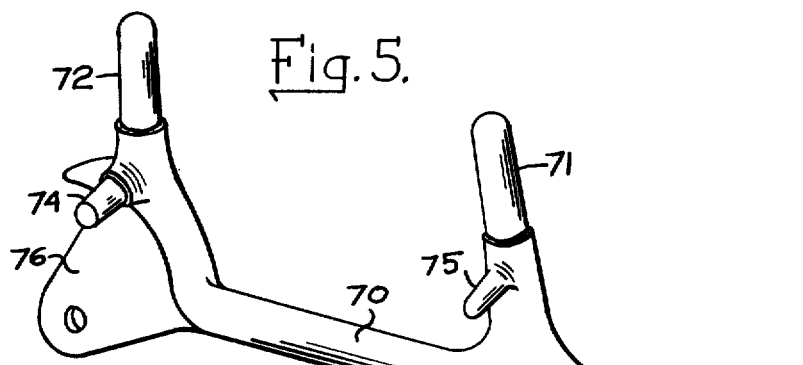
Figure 6:
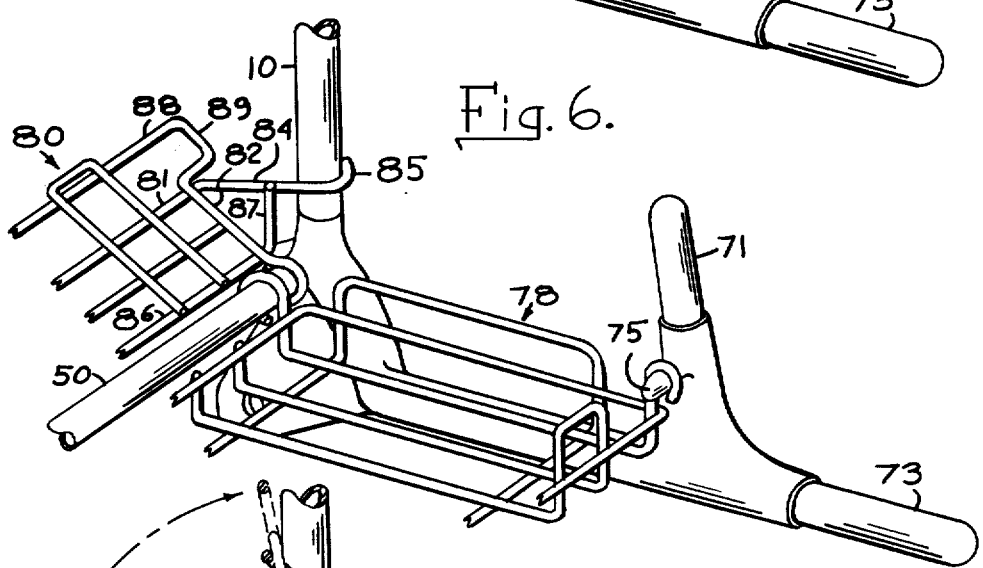
Figure 7:
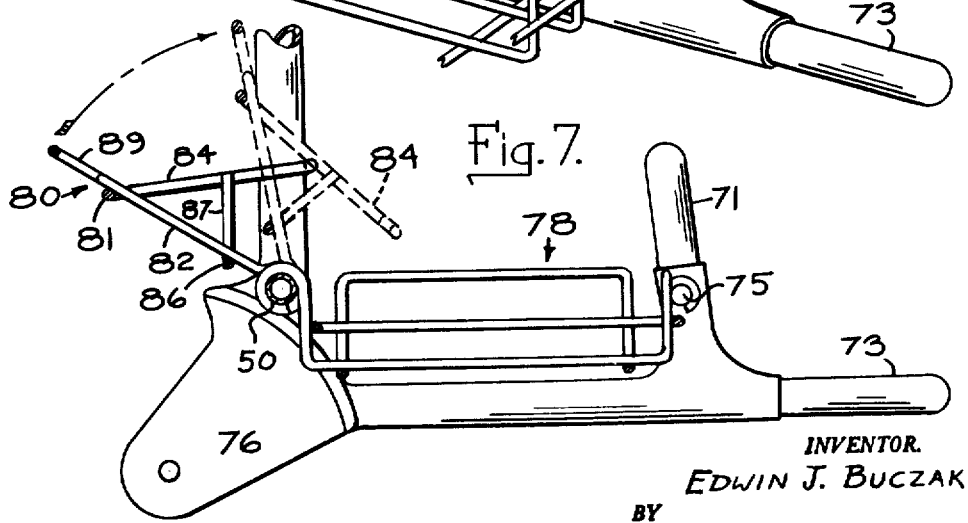

FIG. 5 is a perspective view of a modified casting, similar to FIG. 2 but without the central arch;

FIG. 6 is a fragmentary perspective view of the casting of FIG. 5 and the associated lower tray and hinged shelf, with the extension shelf in a position to receive merchandise;

FIG. 7 is a fragmentary side elevation of the structure of FIG. 6 which illustrates the folding of the shelf extension;

FIG. 8 is a fragmentary side elevation, partly broken away, of a modified form of casting and an associated removable cart handle; and FIG. 9 is an enlarged fragmentary front elevation of a portion of the casting of FIG. 8 with a handle attached thereon by a locking prong as seen from the front.

Referring first to FIGS. 1 to 4 inclusive, the market cart comprises a tubular handle 10 projecting upwardly from a pair of castings 11 secured to the handle and a front U-shaped tubular nose frame 12 projecting forwardly from the castings. The cart further includes a tubular U-shaped basket supporting frame 13 mounted upright on and connected to the castings and carrying an L-shaped member 14 on which the basket 15 is mounted. The basket is made of the usual welded wire structure and need not be further described.

A primary feature of this invention pertains to the castings 11 and the manner of attachment to the U-shaped tubular portions of the frame and handle. These castings 11 are duplicates, except that they are right- and left-handed in their shapes. They may be made of a suitable material, such as cast ductile iron.

Each casting (FIG. 2) comprises a solid central lower body portion 18 having an upstanding post 19 terminating at its top in an accurately shaped substantially cylindrical nipple 20, preferably provided with a rounded or tapered end. The lower part is also terminated at its front in a horizontal nipple 22, similar in shape and diameter to the part 20. At its rear, the casting is thinned to form an upwardly curved arcuate section 23 having a downwardly projecting vertical flange 24. That flange is provided with a hole 25 in which is suitably mounted an axle (not shown) for the wheel 26 complying with standard practice. Upstanding from the arcuate section 23 is a further post 27 terminating in a nipple 28, similar to the nipples 20 and 22 above-mentioned. Each casting also has a horizontal nipple 29 projecting inwardly toward a similar nipple on the opposite casting, and each may be substantially cylindrical and slightly tapered to provide a pressed fit within the open end of the associated tube. A horizontal lug 30 projects inwardly from the post 19 for receiving a downwardly opened hook 31 carried by the lower tray, as will be described.

The U-shaped handle 10 is a suitably shaped tube and the lower ends of the handle terminate in cylindrical openings. The upstanding nipple 28 (FIG. 2) is shaped to fit with a forced or press fit within the open ends of the handle, so that when the parts have been assembled they are rigidly united. The casting is also provided with a shoulder 32 below the nipple 28, which limits the relative movements of the hollow frame 10 and the nipple 28. The other nipples are similarly provided with these limiting shoulders 32 for the same purpose. The vertical cross frame 13 (FIG. 1) is likewise a U-shaped tubular body having the lower ends of its parallel vertical legs attached with a press fit on the nipples 20. Similarly, the tapered substantially U-shaped front end portion 12 is tubular, and its arms are likewise press fitted on the horizontal nipples 22.

Hence, assembly of the frame structure involves merely the simple operation of pressing the casting nipples into the open ends of the frame portions 10, 12 and 13. This provides a rigid and substantially integral structure which remains permanently assembled, as distinguished from a construction in which the various parts of the frame are bolted together or otherwise secured by removable fasteners.

Figure 1:
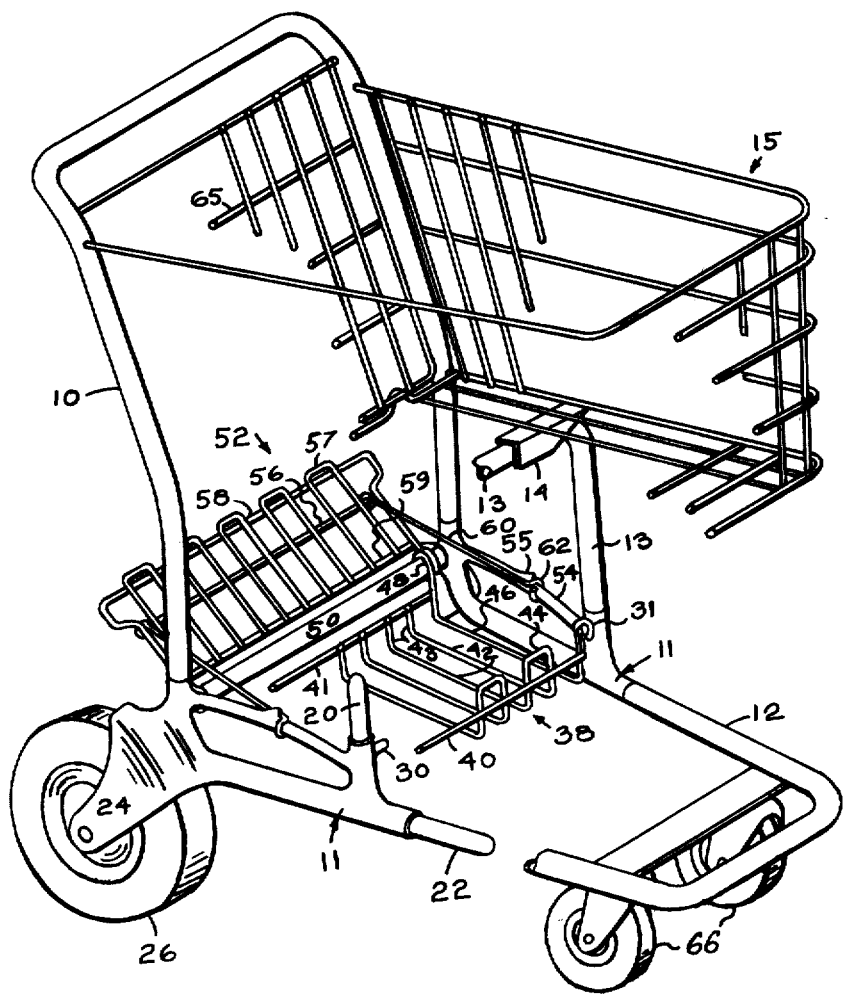
FIG. 1 is a perspective view of a market cart, with parts broken away for clarity of illustration, which shows both a press fitted frame structure and a hinged shelf extension attached to a rearwardly accessible parcel tray beneath the main basket structure.

A further feature of this invention relates to a hinged shelf extension of the lower tray 38 located beneath the basket 15 and at the rear of the upright 13. The lower tray which may be variously constructed is shown in FIGS. 1 and 4 as being formed of two horizontal front and rear wires 40 and 41 to which are welded the longitudinally extending substantially U-shaped wires 42 in order to form a support for grocery articles. The wires 42 are arranged in pairs as shown with upstanding ends 43 at the rear which are welded to the cross rod 41. At the front, each of the adjacent pairs of wires is bent upwardly to form a U-shaped connecting portion 44 which thus provides a smooth tray edge which prevents damage to articles stored thereagainst. The upstanding U-portions 44 are welded to the cross rod 40.

The lower tray 38 is supported by two similar U-shaped wires 46 at opposite sides of the tray which have hooks 31 and 48 at the front and rear ends respectively. Each hook 31 is hooked and locked into place over the inwardly projecting lug 30 of FIG. 2. Each rear hook 48 is looped over and secured on the tube 50. That tube 50 is a cross member of the frame which has been press fitted on the two inwardly projecting nipples 29 and thus integrally connects the castings at the rear.

In accordance with my invention I have provided an extension shelf 52 at the rear of the tray 38, which shelf is hinged to be struck and lifted to a vertical position by the frame member 13 of a second cart when the two carts are nested or telescoped. It is to be noted that the tray 38 is located in the non-nesting zone between the posts 13 and the rear cross member 50. That is, the spaces in front of and at the rear of this zone are occupied by front and rear carts when nested. Hence, only this zone is free for a tray, since other cart structures do not enter this zone during nesting. This shelf 52 extends the parcel zone rearwardly into the space at the rear of the handle 10 later required for nesting and thus supplements the space of the tray 38 and in particular provides access for handling the parcels from the rear.

To permit the nesting operation, this shelf 52 is hinged in such a manner that it may be moved out of an interfering position during nesting of two carts. Preferably the shelf 52 is pivotally mounted on the tube or cross member 50, and it is adapted to lie, during normal use of the cart, in a rearwardly projecting and upwardly sloping position, as shown in full lines in FIG. 4. In this embodiment, each of the castings has a slightly bowed but substantially horizontal arch 54 which has a projection 55 extending upwardly and provided with a forwardly facing shoulder serving as a stop. The hinged shelf 52 has a horizontal cross wire 56 secured medially, as by welding, to the pairs of U-shaped wire members 57, which are in turn welded to the horizontal cross rods 58 and 59 forming the inner and outer edges of the hinged extension shelf 52. To hold that shelf in a rearwardly inclined position, shown best in full lines in FIG. 4, a pair of wires 60 are secured, as by means of closed loops 61, on the cross rod 56 of the shelf. At the forward end of each rod 60 is a rectangular loop 62 shaped to slide on the arch 54 as the shelf 52 is lifted or lowered. The projecting stop 55 limits the rearward motion of the sliding member 60 by engagement with the loop 62, thus holding the shelf in a desired rearwardly projecting position. That shelf is preferably inclined as shown in FIG. 4 to minimize the sliding of articles rearwardly therefrom and primarily to be lifted easily during nesting.

The market cart is provided with a swinging gate 65 in accordance with standard practice which is lifted by the forward or nose end of another basket and permits the nesting or telescoping of the baskets of two adjacent carts. During the nesting of two adjacent carts, the rearwardly inclined shelf 52 (FIG. 4), is raised upwardly by the tubular frame members 13 (FIG. 1) of an adjacent cart approaching from the rear, and it is folded into an upright out of the way position against the lower rear sides of handle 10. During this cycle, the shelf supporting arms 60 ride freely forward along the casting arch 54. As two nested carts are separated for use, the shelf drops under the influence of gravity to a parcel receiving position, shown in solid lines in FIG. 4.

From the foregoing description, it may be appreciated that a folding shelf of this type serves two principal functions. First, the shelf permits a rearward extension of a lower parcel carrying area with complete access from the rear of the cart. Secondly, the automatically collapsible feature of the shelf 52 permits the shelf to fold out of the way so as not to interfere with the undercarriage structure of an adjacent cart during nesting. As is common practice, the front portion of the undercarriage 12 tapers as does the basket 15 to provide for nesting or telescoping, and it has a pair of full-swiveling caster wheels 66 suitably attached thereon.

A simplified modification of the casting is shown in FIG. 5 in which the arch 54 of FIG. 2 is omitted. This casting comprises the horizontal member 70 having projecting nipples 71, 72, and 73 similar to nipples 20, 22, and 28 of FIG. 2 respectively. Similarly, the inwardly projecting lug 75, nipple 74, and wheel supporting flange 76, are identical to corresponding components illustrated in FIG. 2. The casting of FIG. 5 is shown further in FIG. 6 in association with a modified lower shelf and tray construction. In this construction, the hinged shelf 80 has a cross wire 81 extending beyond the opposite side members 82 of the shelf frame. This wire 81 is bent at right angles to form parallel forwardly projecting supporting hook arms 84 which are provided with hooks 85 adapted to engage the lowermost front side of handle 10 when the shelf 80 is in a lowermost position, thus accomplishing a positive stop to limit downward travel of the shelf. A crosswire 86 comprising the lower edge of the shelf also extends beyond the opposite frame members 82 and is bent upwardly to form parallel arms 87. These arms 87 are in turn welded onto the parallel arms 84 of cross wires 81 forming a rigid triangular truss at this point. Thus the shelf 80 and its associated component wires 84 and 87 move rigidly as a unit when the shelf is raised or lowered. The shelf 80 has its topmost cross wire 88 extended outwardly at each side and inturned to form a projecting ear 89 which comes in contact with handle 10 as the shelf is raised, thus serving as a topmost stop.

FIG. 7 is a side view of the construction illustrated in FIG. 6, showing in particular the lowermost and topmost positions of shelf 80. In this construction, the top arch 54 of the FIG. 2 casting is not required. The casting shown in FIGS. 5 and 6 is also assembled within the tubular structure of the undercarriage as previously described.

It is sometimes desirable to have the handle of the cart removable, such as when it is necessary to disassemble the basket from the cart for maintenance or repair purposes. FIGS. 8 and 9 show a structure in which each casting is intended to be rigidly secured to the various other members of the frame except the handle. In that modification, the casting 92 is similar to that shown in FIG. 5 in the provision of the upstanding nipple 93 and the horizontal nipples 94 and 95 corresponding respectively with the parts 20, 22, and 29 of FIG. 2 or the parts 71, 73, and 74 of FIG. 5. The arcuate section 98 corresponding with the arcuate section 23 of FIG. 2 is integral with an upstanding post 99, and that post terminates at its top end in a hook-shaped nipple 100 which has a forwardly projecting locking prong end 101. The U-shaped tubular handle 96 has the usual opening at the bottom of each of its legs, and is shown in section near the bottom ends 97. Each leg of the handle 96 is provided with a forwardly facing hole 102 through which the prong 101 is adapted to project in assembly as a retaining device to firmly hold the handle on the casting.

During assembly, as indicated by the dotted lines of FIG. 8, the handle 96 is tipped forward to a position in which the hooked nipple 100 will fit into the open end of the tube portion 97. Then when the handle 96 is moved rearwardly, it is forced down onto the rounded somewhat conical portion 100 which has its lower end substantially cylindrical in shape and is adapted to fit tightly within the tube portion 97. Thus, by forcing the handle down and tilting it backward to the position shown in full lines in FIG. 8, the prong 101 passes through the hole 102 in the tube end 97 and locks the handle onto the casting. When assembled, the basket is attached to the handle and the frame member 14 and so holds the handle in position. After removal of the basket during disassembly, the handle 96 is simply moved forward to the dotted position of FIG. 8 and then easily removed from the casting. FIG. 9 shows an enlarged front view of the hooked nipple 100 in assembly with the handle 96 with the prong 101 projecting through hole 102 and locking over the shoulder 104 formed by the lower edge of the hole. The other features previously described may be incorporated in the FIG. 8 construction so that the entire undercarriage, except the handle, is permanently and rigidly secured together.

It will now be appreciated that I have provided a market cart in which the frame comprises two opposed solid castings having nipples, preferably both vertical and horizontal, which interfit with the ends of tubular frame members. The tubular portion of the frame preferably comprises a downwardly opening U-shaped cross frame member which serves as a basket support, the vertical legs of which interfit with vertical nipples on the opposed castings. A tubular cross frame member is arranged at the rear of the basket support to connect the castings, and it is spaced from said support to provide room for a lower parcel tray therebetween. A forwardly projecting horizontal U-shaped tubular member 12 also cooperates with the cross frame member 50 and the basket support 13 to connect the castings, as well as to carry the front wheels.

Also, as above explained, the lower tray is located in a zone where it does not interfere with the nesting operation. An extension shelf is pivotally mounted behind the rear cross frame member and thus serves to enlarge or lengthen the lower parcel carrying tray, but it extends into a position of interference with nesting. Hence, the shelf is so mounted, preferably in an upwardly inclined position, that it may be struck by the vertical legs of the basket support of a second cart and lifted to a substantially vertical position during a nesting operation. The shelf is held in a rearwardly inclined position by a suitable support, such as a hook arm which releasably engages a stop on a frame member, such as a portion of the handle or a lug on a casting, and the parts are so arranged that the shelf is free to be raised during nesting or the hook arm may engage the stop and hold the shelf in a lowermost parcel holding position. The cross frame member 50 (FIG. 1) may be considered as both a part of the frame and the rear of the lower tray, as well as a portion of the extension shelf and its hinge.

The casting nipples are interfitted with the tubular ends of the cross frame members to form a permanently rigid structure. The basket is mounted on one of said members and is secured to the handle. The handle likewise interfits with vertical lugs on the opposed castings, and that interfitting arrangement may be permanent because of the parts being assembled under high pressure, or the handle may be made removable, as shown in FIG. 8 and 9, by providing the associated casting nipple with a laterally extending prong or locking lug which engages a shoulder on the handle, and the parts are so arranged that they may be assembled as indicated by the dotted lines in FIG. 8 to lock the projecting prong against a shoulder 104 bounding a hole in the handle when the handle has been moved to its normal operative position prior to securing the basket thereto. This permits removing the basket and the handle from the remainder of the frame by swinging the handle forward relative to the locking lug or prong, and this provides for repairing or rebuilding the basket or other portions of the assembly.

It will be understood that various modifications may be made within the scope of this invention and that the above disclosure is to be interpreted as defining preferred embodiments of the structure and not as imposing limitations on the appended claims.

I claim:

1. A nesting market cart comprising a frame having longitudinally spaced front and rear cross frame members, a basket supported by said frame, a tray fixedly carried on the frame below said basket in front of said rear cross frame member, an extension shelf projecting rearwardly of said tray and rear member, a hinge pivotally supporting the front of said shelf and a stop which holds the shelf in position for loading it from the rear and which provides for the shelf being swung upwardly about the hinge when struck by a front cross frame member of a second cart being nested therewith.

2. A cart according to claim 1 in which the stop is fixed on the frame and the shelf has a supporting hook arm arranged to engage said stop and hold the shelf in a lowered operative position and alternatively to move away from the stop when the shelf is raised.

3. A market cart comprising a U-shaped handle, a basket, an upright U-shaped basket supporting frame, a horizontal U-shaped nose frame, and a pair of right and left hand castings on opposite sides of the cart which have pairs of symmetrically arranged projecting nipples, said handle and frames having tubular ends, one pair of said nipples being mounted in and supporting the ends of the in the ends of said U-shaped frames with a press fit which rigidly support and solely and irremovably connect the frames and castings as an integral structure, and wheels rotatably mounted on the cart which support the same.

4. A market cart comprising a U-shaped handle, a basket, a U-shaped basket supporting frame secured to the the basket, a horizontal U-shaped nose frame and a pair of right and left hand castings on opposite sides of the cart which support and connect the handle and said frames as an assembled structure, said castings having two pairs of upwardly projecting, symmetrically arranged nipples integral therewith and said handle and basket supporting frame having each a pair of parallel, downwardly opening, tubular ends rigidly and irremovably mounted on associated nipples with a press fit, and said castings having a pair of symmetrically arranged, horizontally projecting nipples integral therewith and the nose frame having open tubular ends rigidly and irremovably mounted on the horizontally projecting nipples with a press fit, and wheels rotatively mounted on the castings and the nose frame which support said assembled structure.

5. A market cart comprising a basket, a supporting frame connected thereto, a U-shaped handle having open tubular ends, two opposed members on the opposite sides of the cart which support and connect said frame and handle as an assembled structure, and wheels rotatively mounted on and supporting the cart, each of said members having a projecting nipple integral therewith which is removably mounted in an associated tubular end of the handle and a rigidly fixed, laterally projecting locking prong at the end of the nipple, each of said handle ends having a slot located for interlocking with an associated prong, and said nipples and handle ends being shaped for tiltably seating the handle ends on the nipples in positions where the prongs lock into said slots, said handle being removably secured to the basket and held thereby in its locked position.

References Cited in the file of this patent

UNITED STATES PATENTS

| | | |
|---|---|---|
| 2,511,452 | Anderson et al. | June 13, 1950 |
| 2,639,161 | Goldman | May 19, 1953 |
| 2,764,419 | Enders | Sept. 25, 1956 |
| 2,882,062 | Hoedinghaus et al. | Apr. 14, 1959 |
| 2,890,058 | Cauthon | June 9, 1959 |
| 2,903,269 | Hennion | Sept. 8, 1959 |
| 2,926,021 | Altadonna | Feb. 23, 1960 |

FOREIGN PATENTS

| | | |
|---|---|---|
| 474,165 | Germany | Mar. 27, 1929 |
| 786,137 | Great Britain | Nov. 13, 1957 |
| 1,155,562 | France | Dec. 2, 1957 |
| 1,194,860 | France | May 11, 1959 |

UNITED STATES PATENT OFFICE
CERTIFICATE OF CORRECTION

Patent No. 3,112,934                                        December 3, 1963

Edwin J. Buczak

It is hereby certified that error appears in the above numbered patent requiring correction and that the said Letters Patent should read as corrected below.

Column 6, line 41, after "the", second occurrence, insert -- handle, and two pairs of nipples interfitting respectively --.

Signed and sealed this 28th day of April 1964.

(SEAL)
Attest:

ERNEST W. SWIDER
Attesting Officer

EDWARD J. BRENNER
Commissioner of Patents